United States Patent
Liu et al.

(10) Patent No.: US 12,407,281 B2
(45) Date of Patent: Sep. 2, 2025

(54) CONTROL METHOD FOR STEPPING MOTOR OF THERMAL PRINTER

(71) Applicant: Zhuhai Xprinter Electronics Technology Co., Ltd., Zhuhai (CN)

(72) Inventors: Dan Liu, Zhuhai (CN); Chenchen Li, Zhuhai (CN)

(73) Assignee: Zhuhai Xprinter Electronics Technology Co., Ltd., Zhuhai (CN)

( * ) Notice: Subject to any disclaimer, the term of this patent is extended or adjusted under 35 U.S.C. 154(b) by 162 days.

(21) Appl. No.: 18/522,693

(22) Filed: Nov. 29, 2023

(65) Prior Publication Data
US 2024/0364244 A1    Oct. 31, 2024

(30) Foreign Application Priority Data
Apr. 25, 2023  (CN) ......................... 202310462569.9

(51) Int. Cl.
| | |
|---|---|
| H02P 8/14 | (2006.01) |
| H02P 8/10 | (2006.01) |
| H02P 8/18 | (2006.01) |
| H02P 8/22 | (2006.01) |
| H02P 101/00 | (2015.01) |

(52) U.S. Cl.
CPC .................. *H02P 8/22* (2013.01); *H02P 8/10* (2013.01); *H02P 8/18* (2013.01); *H02P 2101/00* (2015.01); *H02P 2209/09* (2013.01)

(58) Field of Classification Search
CPC ...... H02P 8/10; H02P 8/14; H02P 8/18; H02P 8/22; H02P 2209/09; H02P 2101/00; Y02P 70/10
USPC ........................................................... 318/685
See application file for complete search history.

(56) References Cited

U.S. PATENT DOCUMENTS

| | | | | |
|---|---|---|---|---|
| 6,150,789 | A * | 11/2000 | Pulford, Jr. ............... | H02P 8/14 318/696 |
| 6,236,175 | B1 * | 5/2001 | Mourad .................... | H02P 6/18 388/811 |
| 6,806,675 | B2 * | 10/2004 | Wang ........................ | H02P 8/12 318/434 |
| 2002/0074968 | A1 * | 6/2002 | Mitsuda .................. | H02P 6/182 318/727 |
| 2003/0067280 | A1 * | 4/2003 | Wang ........................ | H02P 8/12 318/685 |
| 2020/0287496 | A1 * | 9/2020 | Shamoto ................. | H02P 27/08 |

* cited by examiner

*Primary Examiner* — Gabriel Agared
(74) *Attorney, Agent, or Firm* — Westbridge IP LLC

(57) ABSTRACT

A control method for a stepping motor of a thermal printer of the present application includes the following steps: in a starting stage of the thermal printer, transmitting a square wave control signal to the stepping motor; in a starting process, using the square wave control signal and switching to square wave control with Pulse Width Modulation (PWM) for outputting in a case of accelerating to the maximum set speed according to an accelerometer; in a normal printing process, according to changes in a printing rate, adaptively dynamically adjusting a printing speed. In a motor deceleration process, the duty cycle of the motor inner-loop PWM control is unchanged. The square wave control and the square wave with the PWM are used for switching control or combining control according to different stages of work.

3 Claims, 4 Drawing Sheets

---

S1: in a case that the thermal printer prints according to printed content, the stepping motor being in a starting stage, transmitting a printing instruction by a human-computer interaction module, and receiving, by a control unit module, the printing instruction and transmitting a square wave control signal to a power amplifier circuit that drives the stepping motor S2: in a starting process of the stepping motor, using the square wave control signal, and switching to square wave control with the PWM for outputting in a case of accelerating to the maximum set speed according to an accelerometer, wherein a switching point between the square wave control and the square wave control with the PWM is selected at a moment of accelerating to the highest speed, the accelerometer is a speedometer that is set from a stop to the maximum speed of the stepping motor, the motor speed corresponding to the highest frequency of the accelerometer is $V_{max}$, which is called the maximum value of the accelerometer S3: in a normal printing process, according to changes in a printing rate, dynamically proportionally linearly reducing the square wave frequency of the motor outer-loop PWM control according to a proportional linear increase of the printing rate, simultaneously, dynamically proportionally linearly reducing the speed of the motor, adaptively proportionally linearly reducing the square wave frequency and a duty cycle of the motor inner-loop PWM control, and adaptively dynamically adjusting a printing speed, wherein the duty cycle of the motor inner-loop PWM control is unchanged in a motor deceleration process, and the printing rate=a quantity of black points of the printed content/a quantity of points of the whole row

| in a case that the thermal printer prints according to printed content, the stepping motor being in a starting stage, transmitting a printing instruction by a human-computer interaction module, and receiving, by a control unit module, the printing instruction and transmitting a square wave control signal to a power amplifier circuit that drives the stepping motor | ─ S1 |

| in a starting process of the stepping motor, using the square wave control signal, and switching to square wave control with the PWM for outputting in a case of accelerating to the maximum set speed according to an accelerometer, wherein a switching point between the square wave control and the square wave control with the PWM is selected at a moment of accelerating to the highest speed, the accelerometer is a speedometer that is set from a stop to the maximum speed of the stepping motor, the motor speed corresponding to the highest frequency of the accelerometer is $V_{max}$, which is called the maximum value of the accelerometer | ─ S2 |

| in a normal printing process, according to changes in a printing rate, dynamically proportionally linearly reducing the square wave frequency of the motor outer-loop PWM control according to a proportional linear increase of the printing rate, simultaneously, dynamically proportionally linearly reducing the speed of the motor, adaptively proportionally linearly reducing the square wave frequency and a duty cycle of the motor inner-loop PWM control, and adaptively dynamically adjusting a printing speed, wherein the duty cycle of the motor inner-loop PWM control is unchanged in a motor deceleration process, and the printing rate=a quantity of black points of the printed content/a quantity of points of the whole row | ─ S3 |

Fig. 4

CONTROL METHOD FOR STEPPING MOTOR OF THERMAL PRINTER

CROSS-REFERENCE TO RELATED APPLICATIONS

This application claims priority to Chinese Patent Application No. 202310462569.9, filed on Apr. 25, 2023, which is incorporated herein by reference in its entirety.

TECHNICAL FIELD

The present application relates to control technologies for motors of printers, and in particular, to a control method for a stepping motor of a thermal printer.

BACKGROUND

Stepping motors are widely applied to motion control systems with high requirement on precision, such as robots, printers, floppy disc drives, plotters, and mechanical valve controllers. The stepping motor is a digitally controlled motor that converts a pulse signal into angular displacement. That is, the stepping motor rotates by an angle when the pulse signal is given. Therefore, it is suitable to be controlled by a single chip microcomputer. The biggest characteristic between the stepping motor and other control motors is that the stepping motor is controlled by inputting the pulse signal, that is, a total rotating angle of the motor is determined by a number of input pulses, whereas a rotating speed of the motor is determined by a pulse signal frequency.

In a related art, the stepping motors may be classified as variable reluctance (VR) stepping motors, permanent magnet (PM) stepping motors, and hybrid (HB) stepping motors. A drive circuit of the stepping motor works according to a control signal, and the control signal is generated by the single chip microcomputer. For example, a working mode of the HB is that a used basic control process is to control commutation sequence-power-on commutation. This control process is referred to as pulse distribution. A power-on sequence of various phases is A-B-C-D. A power-on control pulse has to strictly control the on/off of phases A, B, C, and D respectively according to this sequence, and this is a so-called pulse ring distributor.

At present, the stepping motor of a conventional thermal printer is controlled by using a square wave stepping control method, and a phase control method of a driver. As shown in FIG. 1 below, there are 4 control signals input to the driver of the stepping motor. AIN1 and AIN2 are in reverse, BIN1 and BIN2 are in reverse, and a phase difference between AIN1 and BIN1 is 90°. During working, the driver of the stepping motor amplifies a signal, and an electrical signal output to the stepping motor has high current and sufficient energy, and can directly drive the motor to run.

However, the control method for a stepping motor of a thermal printer has the following disadvantages: the square wave control method for a stepping motor of the existing conventional thermal printer is easy to control. During long-time working, the stepping motor of the printer generates a large amount of heat, and the temperature rise caused by accumulated heat may exceed 100° C., which easily melts a plastic printer shell that mounted and fixed on the motor and even burn out the motor; the control method for a stepping motor of a printer is monotonous, low-frequency resonance is easily caused with the shell, noise is high, and environmental noise pollution is increased; and, such product has a short service life, and the product powered by a battery has high power consumption since the electrical signal given to the stepping motor has high current, thereby affecting the working hours of the product.

Therefore, it is urgent to improve the existing control method for a stepping motor of a printer.

SUMMARY

The present application provides a control method for a stepping motor of a thermal printer, using square wave control and a square wave with Pulse Width Modulation (PWM) for switching control according to different stages of work, which solves problems of heat and noise of the motor, prolongs power supply time, saves energy consumption, and avoids the problem of insufficient energy during starting.

To solve the technical problems, the present application adopts the following technical schemes.

A control method for a stepping motor of a thermal printer uses square wave control or/and a square wave with PWM for switching control or combining control according to different stages of work. The control method includes the following steps.

At S1, in a case that the thermal printer prints according to printed content, the stepping motor is in a starting stage, a human-computer interaction module transmits a printing instruction, a control unit module receives the printing instruction and transmits a square wave control signal to a power amplifier circuit that drives the stepping motor.

At S2, in a starting process of the stepping motor, the square wave control signal is used and is switched to square wave control with the PWM for outputting in a case of accelerating to the maximum set speed according to an accelerometer. A switching point between the square wave control and the square wave control with the PWM is selected at a moment of accelerating to the highest speed; the accelerometer is a speedometer that is set from stop to the maximum speed of the stepping motor; and a motor speed corresponding to the highest frequency of the accelerometer is $V_{max}$, which is called the maximum value of the accelerometer.

The control method for the square wave control with the PWM is a two-stage PWM control method, and the two-stage PWM control method includes motor outer-loop PWM control and motor inner-loop PWM control. The motor outer-loop PWM control is the square wave control, and the motor inner-loop PWM control is to use a variable PWM waveform that is embedded into a certain phase segment of the motor outer-loop PWM control, cycle time of the motor outer-loop PWM control is converted into a square wave frequency corresponding to the motor outer-loop PWM, and corresponding frequencies are arranged from small to large since cycles are arranged from large to small.

At S3, in a normal printing process, according to changes in a printing rate, the square wave frequency of the motor outer-loop PWM control is dynamically proportionally linearly reduced according to a proportional linear increase of the printing rate, simultaneously, the speed of the motor is dynamically proportionally linearly reduced, the square wave frequency and a duty cycle of the motor inner-loop PWM control are adaptively proportionally linearly reduced, and a printing speed is adaptively dynamically adjusted. The duty cycle of the motor inner-loop PWM control is unchanged in a motor deceleration process, and the printing rate=a quantity of black points of the printed content/a quantity of points of the whole row.

Further, S3 further includes the following operations.

In an accelerating stage of the printing process, the square wave frequency of the motor outer-loop PWM control proportionally increases as the speed increases according to the accelerometer; and the duty cycle of the motor inner-loop PWM control proportionally decreases with the duty cycle of the motor inner-loop PWM control corresponding to a proportional increase of the square wave frequency of the motor outer-loop PWM control according to the value of the accelerometer.

Further, the control method also includes the following operation.

In a case that the thermal printer uses a battery to drive the stepping motor to print, and the speed of the stepping motor is controlled, an electricity quantity rate parameter δ is added. The electricity quantity rate parameter δ=a current battery voltage/a full charge voltage.

The maximum current speed of the stepping motor is set as $V_{tmax}$, and the maximum speed of the stepping motor in the accelerometer is set as $V_{max}$. The maximum current speed $V_{tmax}$ is directly associated with the current battery voltage, when the electricity quantity of the battery is low, the maximum current speed of the stepping motor satisfies $V_{tmax}=V_{max}*δ$, and before each time of printing, the maximum current speed $V_{tmax}$ of the stepping motor is re-calculated according to the current battery voltage.

The present application has the following beneficial effects.

In the control method for the stepping motor provided by the present application, according to different stages of work of the thermal printer, the square wave control is used or the square wave with the PWM is used for switching control or combining control, so that the stepping motor works at an appropriate frequency. During starting, the square wave control method is used, which ensures maximum output torque of the stepping motor, avoids a start step loss situation, and meanwhile, avoids a problem of insufficient energy during start. In the normal printing process, it is switched to the square wave control with the PWM, and a high-frequency vibration frequency can avoid a low-frequency resonance point of a shell of the thermal printer, which effectively reduces noise, and reduces noise pollution.

Moreover, in the normal printing process, it is switched to the square wave control with the PWM; and when the thermal printer is driven by using the battery, before each time of printing, the maximum current speed $V_{tmax}$ of the stepping motor is re-calculated according to the current battery voltage. In the two control modes above, an average current value transmitted to the stepping motor by the driver is reduced, and additional thermal generated by the stepping motor is reduced since the input energy of the stepping motor is reduced, which can effectively control the problem of heating of the stepping motor, and effectively avoid melting a plastic printer shell for mounting and fixing the motor. Meanwhile, an average current input into the driver is reduced, and the saved energy can be used for doing useful work. For a portable product, the endurance of the whole system can be improved, the power supply time can be prolonged, and the energy consumption can be reduced.

BRIEF DESCRIPTION OF THE DRAWINGS

FIG. 4 is a control method for a stepping motor of a thermal printer.

DETAILED DESCRIPTION OF THE EMBODIMENTS

Technical solutions in the embodiments of the present application will be clearly and completely described below with reference to the drawings in the embodiments of the present application. Apparently, the described embodiments are merely part rather than all of the embodiments of the present application. On the basis of the embodiments of the present application, all other embodiments obtained by those of ordinary skill in the art without creative work fall within the scope of protection of the present application.

A control method for a stepping motor of a thermal printer uses square wave control and a square wave with PWM for switching control or combining control according to different stages of work. As shown in FIG. 4. The control method includes the following steps.

At S1, in a case that the thermal printer prints according to printed content, the stepping motor is in a starting stage, a human-computer interaction module transmits a printing instruction, a control unit module receives the printing instruction and transmits a square wave control signal to a power amplifier circuit that drives the stepping motor. Square wave control is used, which ensures maximum output torque of the stepping motor, and avoids a start step loss situation.

Figure 1:
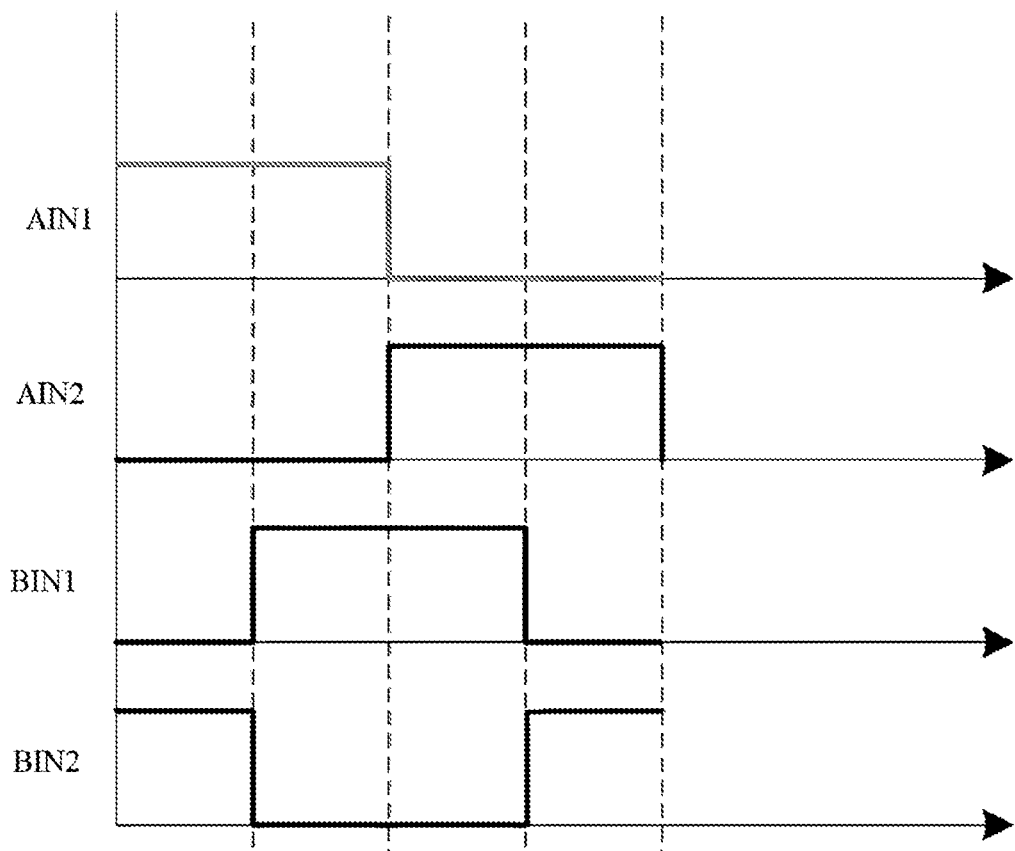
FIG. 1 is a schematic diagram of square wave stepping control of a thermal printer in a related art.
Figure 2:
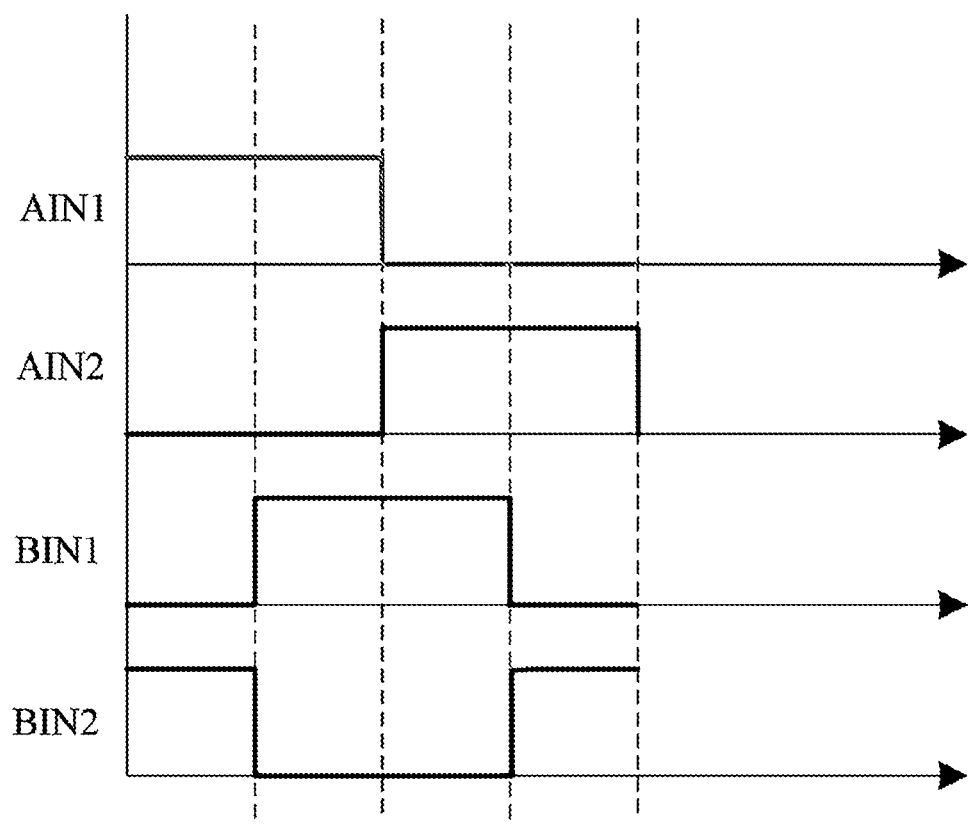
FIG. 2 is a schematic diagram of square wave stepping control when a thermal printer in the present application is started.

At S2, as shown in FIG. 2, in a starting process of the stepping motor, the square wave control signal is used and is switched to square wave control with the PWM for outputting in a case of accelerating to the maximum set speed according to an accelerometer. A switching point between the square wave control and the square wave control with the PWM is selected at a moment of accelerating to the highest speed; the accelerometer is a speedometer that is set from stop to the maximum speed of the stepping motor; and a motor speed corresponding to the highest frequency of the accelerometer is $V_{max}$, which is called the maximum value of the accelerometer.

The control method for the square wave control with the PWM is a two-stage PWM control method, and the two-stage PWM control method includes motor outer-loop PWM control and motor inner-loop PWM control. The motor outer-loop PWM control is the square wave control, and the motor inner-loop PWM control is to use a variable PWM waveform that is embedded into a certain phase segment of the motor outer-loop PWM control. Cycle time of the motor outer-loop PWM control is converted into a square wave frequency corresponding to the motor outer-loop PWM, and corresponding frequencies (f) are arranged from small to large since cycles (time) are arranged from large to small.

Figure 3:
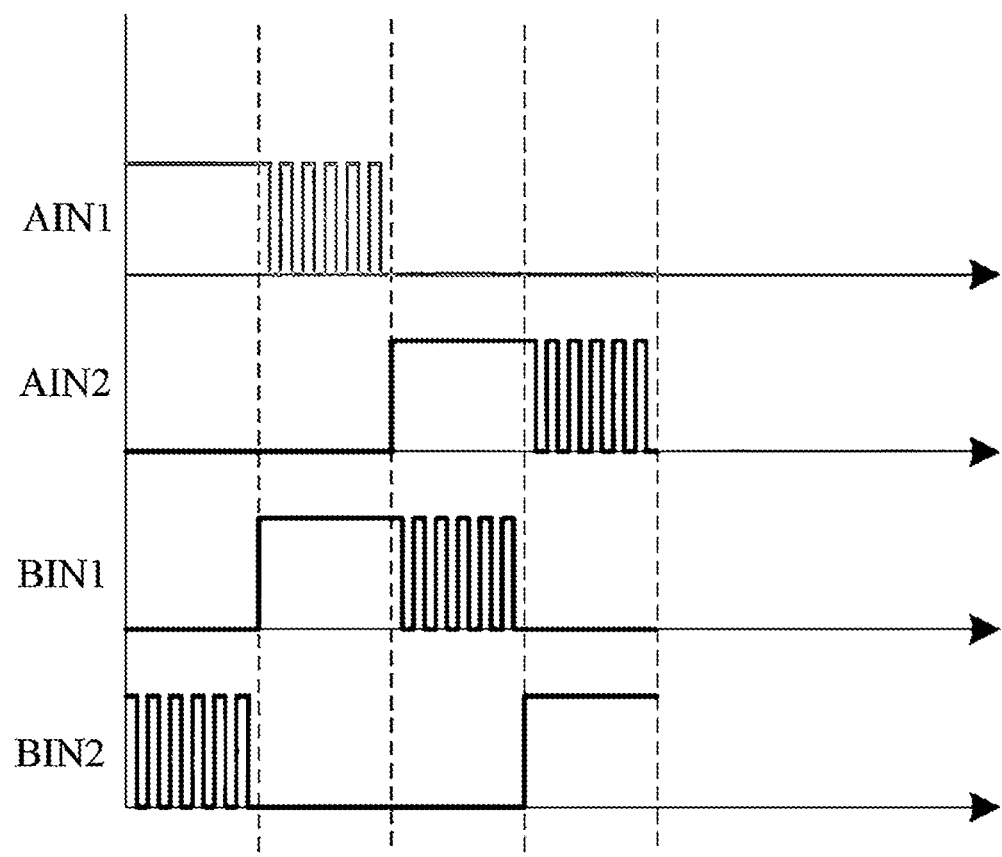
FIG. 3 is a schematic diagram of square wave stepping control with a PWM output when a thermal printer in the present application reaches a set speed.

At S3, in a normal printing process, as shown in FIG. 3, according to changes in a printing rate, the square wave frequency of the motor outer-loop PWM control is dynamically proportionally linearly reduced according to a proportional linear increase of the printing rate, simultaneously, the speed of the motor is dynamically proportionally linearly reduced, square wave frequency and a duty cycle of the motor inner-loop PWM control are adaptively proportionally linearly reduced, and a printing speed is adaptively dynamically adjusted to each a balance among speed, noise, and motor rotating torque. The duty cycle of the motor inner-loop PWM control is unchanged in a motor deceleration process, and the printing rate=a quantity of black points of the printed content/a quantity of points of the whole row.

For example, with the increase of the printing rate, the motor needs to enter a deceleration process, the frequency of the motor outer-loop PWM control will be reduced, for example, the printing rate exceeds 25%, the motor is decelerated by 25%, and the frequency is reduced by 25%; the printing rate exceeds 50%, the motor is decelerated by 50%, and the frequency is reduced by 50%; and the printing rate exceeds 75%, the motor is decelerated by 75%, and the frequency is reduced by 75%. That is, the motor outer-loop PWM control is in linear deceleration.

S3 further includes the following operations.

In an accelerating stage of the printing process (not the starting process of the stepping motor in a non-printing state), the square wave frequency of the motor outer-loop PWM control proportionally increases as the speed increases according to the accelerometer; and the duty cycle of the motor inner-loop PWM control proportionally decreases with the duty cycle of the motor inner-loop PWM control corresponding to a proportional increase of the square wave frequency of the motor outer-loop PWM control according to a value of the accelerometer.

For example, in the acceleration stage of the printing process, when the square wave frequency of the motor outer-loop PWM control reaches 50% of the maximum value of the accelerometer, the duty cycle of the motor inner-loop PWM control is 75%; the square wave frequency of the motor outer-loop PWM control reaches 75% of the maximum value of the accelerometer, the duty cycle of the motor inner-loop PWM control is 50%; and when the frequency of the square wave of the motor outer-loop PWM control reaches the maximum value of the accelerometer, the duty cycle of the motor inner-loop PWM control is 25%.

Moreover, in a case that the thermal printer uses a battery to drive the stepping motor to print, and the speed of the stepping motor is controlled, an electricity quantity rate parameter δ is added. The electricity quantity rate parameter δ=a current battery voltage/a full charge voltage. The maximum current speed of the stepping motor is set as $V_{tmax}$, and the maximum speed of the stepping motor in the accelerometer is set as $V_{max}$. The maximum current speed $V_{tmax}$ is directly associated with the current battery voltage, when the electricity quantity of the battery is low, the maximum current speed of the stepping motor satisfies $V_{tmax}=V_{max}*\delta$, and before each time of printing, the maximum current speed $V_{tmax}$ of the stepping motor is re-calculated according to the current battery voltage.

In the control method for the stepping motor used in the embodiment, during starting, the square wave control method is used, which ensures maximum output torque of the stepping motor, avoids a start step loss situation, and meanwhile, avoids a problem of insufficient energy during start. In the normal printing process, it is switched to the square wave control with the PWM, which can not only avoid a low-frequency resonance point of a shell of the thermal printer and effectively reduces noise pollution, but also effectively reduce an average current value transmitted to the stepping motor by the driver, effectively control a heating problem of the stepping motor, thereby improving the endurance of the whole system, prolonging the power supply time, and reducing energy consumption.

The above embodiment is only a preferred embodiment of the present application, and is not intended to limit the implementation scope of the present application. All equivalent changes made according to the shape, structure, and principle of the present application fall within the scope of protection of the present application.

What is claimed is:

1. A control method for a stepping motor of a thermal printer, wherein square wave control or/and a square wave with Pulse Width Modulation (PWM) are used for switching control or combining control according to different stages of work; the control method comprises the following steps:

S1, in a case that the thermal printer prints according to printed content, the stepping motor being in a starting stage, transmitting a printing instruction from a human-machine interface module, and receiving, by a control unit module, the printing instruction, and transmitting a square wave control signal to a power amplifier circuit that drives the stepping motor;

S2, in a starting process of the stepping motor, using the square wave control signal, and switching to square wave control with the PWM for outputting in a case of accelerating to the maximum set speed according to an accelerometer, wherein a switching point between the square wave control and the square wave control with the PWM is selected at a moment of accelerating to the highest speed, the accelerometer is a speedometer that is set from zero to the maximum speed of the stepping motor, the motor speed corresponding to the highest frequency of the accelerometer is $V_{max}$, which is called the maximum value of the accelerometer, wherein the control method for the square wave control with the PWM is a two-stage PWM control method, the two-stage PWM control method comprises motor outer-loop PWM control and motor inner-loop PWM control, the motor outer-loop PWM control is the square wave control, and the motor inner-loop PWM control is to use a variable PWM waveform that is embedded into a certain phase segment of the motor outer-loop PWM control, cycle time of the motor outer-loop PWM control is converted into a square wave frequency corresponding to the motor outer-loop PWM, and corresponding frequencies are ordered in ascending magnitude since the respective cycle durations decrease in descending order; and S3, in a normal printing process, according to changes in a printing rate, dynamically and linearly reducing the square wave frequency of the motor outer-loop PWM control in proportion to a proportional linear increase of the printing rate, simultaneously, dynamically and linearly reducing the speed of the motor in proportion, adaptively proportionally linearly reducing the square wave frequency and a duty cycle of the motor inner-loop PWM control, and adaptively dynamically adjusting a printing speed, wherein the duty cycle of the motor inner-loop PWM control is unchanged in a motor deceleration process, and the printing rate equals a quantity of black points of the printed content/a quantity of points of the whole row.

2. The control method according to claim 1, wherein S3 further comprises:

in an accelerating stage of the printing process, the square wave frequency of the motor outer-loop PWM control proportionally increases as the speed increases according to the accelerometer; and the duty cycle of the motor inner-loop PWM control proportionally decreases with the duty cycle of the motor inner-loop PWM control corresponding to a proportional increase of the square wave frequency of the motor outer-loop PWM control according to a value of the accelerometer.

3. The control method according to claim 1, further comprising:

in a case that the thermal printer uses a battery to drive the stepping motor to print, and the speed of the stepping motor is controlled, adding an electricity quantity rate parameter δ, wherein the electricity quantity rate parameter δ=a current battery voltage/a full charge voltage; and setting the maximum current speed of the stepping motor as $V_{tmax}$, and the maximum speed of the stepping motor in the accelerometer as $V_{max}$, wherein the maximum current speed $V_{tmax}$ is directly associated with the current battery voltage, when the electricity quantity of the battery is low, the maximum current speed of the stepping motor satisfies $V_{tmax}=V_{max}*δ$, and before each time of printing, the maximum current speed $V_{tmax}$ of the stepping motor is re-calculated according to the current battery voltage.

\* \* \* \* \*